Feb. 14, 1950   J. B. STIER   2,497,280
EGG MOLD
Filed May 3, 1948

INVENTOR.
Joseph B. Stier
BY Harry Radzinsky
Attorney

Patented Feb. 14, 1950

2,497,280

UNITED STATES PATENT OFFICE 2,497,280

EGG MOLD

Joseph B. Stier, New York, N. Y.

Application May 3, 1948, Serial No. 24,881

2 Claims. (Cl. 99—428)

This invention relates to a device for shaping or molding eggs so that an egg, when fried, will assume an ornamental and attractive shape, thus enhancing its appearance and enabling it to be presented in an attractive and appetizing manner.

The conventional frying of an egg usually involves dropping the egg from the broken shell onto the surface of a hot griddle or into a frying pan, and the egg, and especially the white thereof, will run in haphazard manner over the surface on which it is deposited so that the fried egg will either assume an irregular form or a more or less shapeless outline. The present invention contemplates the provision of a mold or shaping means by which the egg, when deposited on the heated surface which fries it, will assume the shape of said mold and the resultant fried product will be presented in a controlled and ornamental shape.

Another object of the invention is to provide a shaping device for an egg by means of which the egg will assume the shape and appearance of a flower, as for example, a daisy, with the yolk of the egg occupying the position of the flower center, and the white of the egg forming the petals thereof.

These and other objects are attained by the invention, a more particular description of which will hereinafter appear and be set forth in the claims appended hereto.

In the accompanying drawing, wherein an illustrative embodiment of the invention is disclosed—

Figure 1:
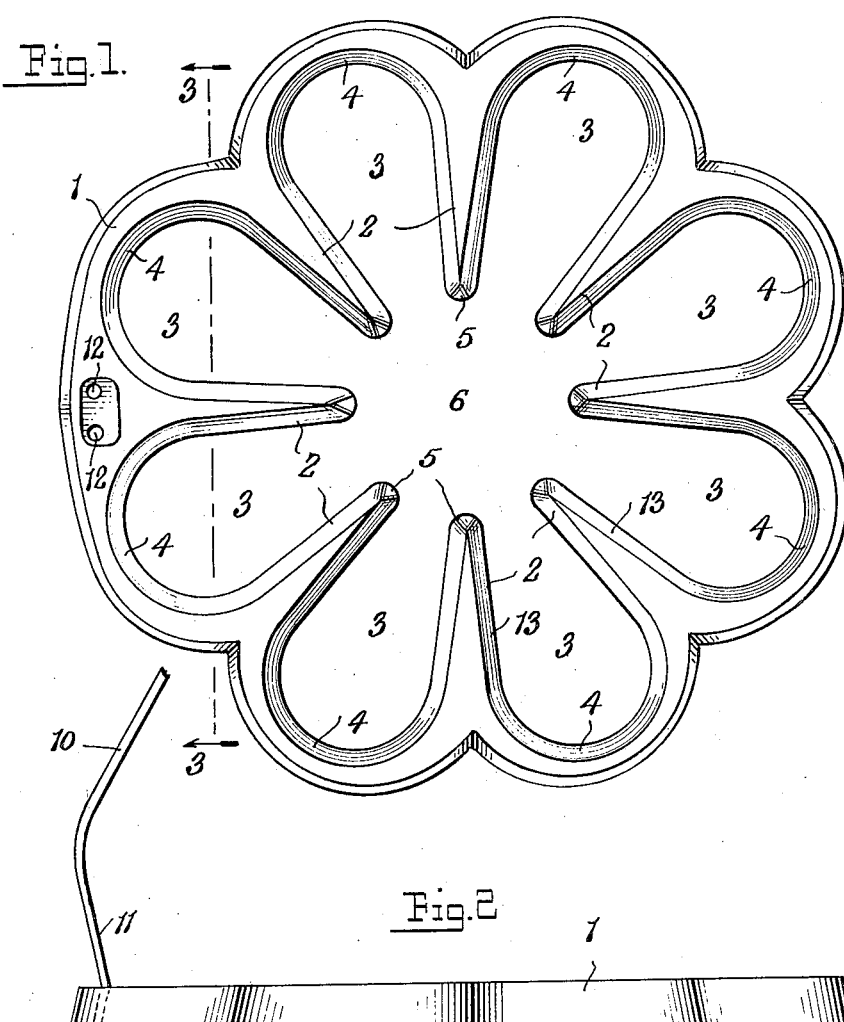
Fig. 1 is a top plan view of a mold or egg shaping device, constructed in accordance with the invention.
Figure 2:
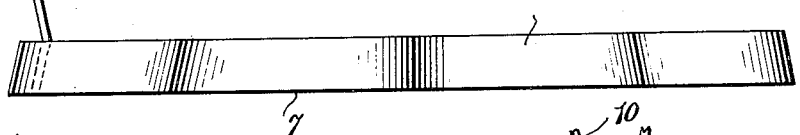
Fig. 2 is a side elevation of the same.

With reference to the drawing, the device shown therein is intended to mold or shape an egg in a floral or daisy form, and it comprises a frame which includes an outer circumferential and substantially annular rim 1 from which extends a plurality of inwardly extending radial and integral bars 2. The frame is preferably composed of metal. The bars 2 are so shaped and spaced apart that the same define a plurality of substantially like radial spaces or chambers 3 between them. Such spaces or chambers 3 are thus separated by the bars 2, which constitute dividing partitions between the chambers 3, and the shape of said bars and the cooperating inner surfaces 4 of the rim 1 is such that the chambers 3 constitute molds which shape the white of the egg into petal-like form.

The several bars 2 converge inwardly from the annular rim 1 and the inner ends 5 of the bars are spaced apart to thereby define a central substantially circular space or chamber 6 which is in communication with the several chambers 3. The surfaces of the bars and inner surface of the rim 1 may be inclined as indicated at 13, if desired.

Figure 4:
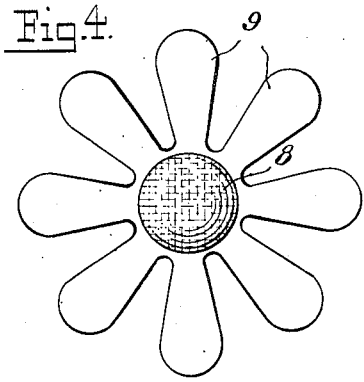
Fig. 4 is a top plan view showing an egg after having been fried and shaped by the device.
Figure 3:
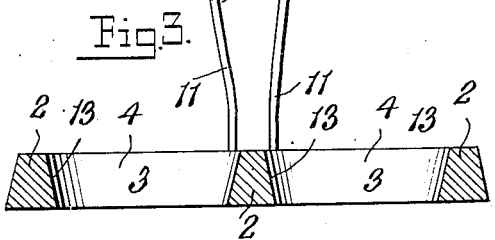
Fig. 3 is a sectional view taken on the line 3—3 of Fig. 1, looking in the direction of the arrows.

In operation, the mold or egg shaping device is rested on its flat bottom 7 on top of a griddle or other heated surface, or it may be placed within a frying pan, and the egg to be fried is then opened over the center portion of the shaping device and deposited in substantially the center of the same so that the yolk 8 of the egg is positioned and confined in the central circular chamber 6. The white of the egg, being of more fluid condition than the yolk, will tend to flow laterally from the yolk, and while the yolk will be confined in the central chamber 2 of the mold, the white will flow into, fill and be shaped by the radial chambers 3. After the egg is fried, it will be obvious that when the mold is lifted away, the resultant egg will appear as in Fig. 4. The resemblance to a flower, namely, a daisy, will be at once apparent, with the yolk 8 of the egg forming the yellow center of the flower and the petals 9 thereof being formed by the fried white of the egg. When an egg thus fried is placed upon a plate of a contrasting color a very striking, attractive and appetizing effect is produced.

To enable the shaping device or mold to be readily placed on a frying surface and to be easily lifted therefrom, a handle 10 is provided. The same may be of a detachable nature, and in the form shown, it consists of a wire loop having legs 11 which enter holes 12 provided in the top of the mold. The springiness or resiliency of the handle will enable the same to engage the mold securely and enable the mold to be conveniently handled. If desired, a handle may be provided which will be permanently attached to the mold or a separable handle or some other form than that described can be used.

While the mold herein described is one which is adapted for the frying of a single egg, and it results in shaping the egg to a certain specific form, namely, in the shape of a daisy, it will be obvious that other forms may be employed so that other interesting and attractive formations of the egg will result. Also while the specific mold disclosed is intended for the reception of a single egg, it will be apparent that a plurality of such molds may be coupled together or a mold having a plurality of apertures for receiving a number of eggs simultaneously may be readily employed without departing from the spirit of the present invention.

Having thus described one embodiment of the invention, it is obvious that the same is not to be restricted thereto, but is broad enough to cover all structures coming within the scope of the annexed claims.

What I claim is:

1. A mold for eggs comprising an open frame having a rim, bars integrally formed thereon and extending inwardly from the rim toward the center of the frame, the bars being similar in height to the rim, the inner ends of said bars being spaced apart to define a central enclosure and the spaces between the bars being in communication with said central enclosure, whereby an egg deposited in the central enclosure will have its yolk confined therein and its white permitted to flow laterally between the bars and be separated thereby into a plurality of petal-like shapes, the lateral flow of the same being confined by the rim.

2. A device for molding an egg for frying comprising, an annular frame having a rim provided with inwardly extending partition-like separators dividing the interior of the frame into a plurality of separate radial divisions defined by said separators, the inner ends of the separators defining a central circular area with which the divisions are in communication, whereby an egg deposited in the central portion of the frame will have its yolk maintained in said central circular area and its white flowed into the radial divisions so that the fried egg will conform in shape to the interior of the frame and present the shape and aspect of a flower.

JOSEPH B. STIER.

REFERENCES CITED

The following references are of record in the file of this patent:

UNITED STATES PATENTS

| Number | Name | Date |
| --- | --- | --- |
| 1,350,651 | Hirst | Aug. 24, 1920 |
| 1,595,356 | Moseman | Aug. 10, 1926 |
| 1,925,700 | Matter | Sept. 5, 1933 |
| 2,081,080 | Baker | May 18, 1937 |

FOREIGN PATENTS

| Number | Country | Date |
| --- | --- | --- |
| 225,741 | Germany | Sept. 16, 1910 |